(12) United States Patent
Otanez et al.

(10) Patent No.: US 7,931,561 B2
(45) Date of Patent: Apr. 26, 2011

(54) AGGRESSIVE TORQUE CONVERTER CLUTCH SLIP CONTROL DESIGN THROUGH DRIVELINE TORSIONAL VELOCITY MEASUREMENTS

(75) Inventors: Paul G Otanez, Troy, MI (US); Farzad Samie, Franklin, MI (US); Chunhao J. Lee, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 606 days.

(21) Appl. No.: 12/043,499

(22) Filed: Mar. 6, 2008

(65) Prior Publication Data
US 2009/0149298 A1   Jun. 11, 2009

Related U.S. Application Data

(60) Provisional application No. 61/012,194, filed on Dec. 7, 2007.

(51) Int. Cl.
*B60W 10/06* (2006.01)
*B60W 10/10* (2006.01)
(52) U.S. Cl. .......................... 477/176; 477/54
(58) Field of Classification Search .......... 477/52, 477/53, 54, 64
See application file for complete search history.

(56) References Cited

U.S. PATENT DOCUMENTS

| | | | |
|---|---|---|---|
| 2002/0173404 A1* | 11/2002 | Takatori et al. | 477/53 |
| 2005/0137059 A1* | 6/2005 | Takahashi | 477/169 |

FOREIGN PATENT DOCUMENTS

| | | | |
|---|---|---|---|
| JP | 2626393 | B2 | 7/1997 |
| JP | 10019119 | A | 1/1998 |
| JP | 3518648 | B2 | 4/2004 |

\* cited by examiner

*Primary Examiner* — Edwin A Young
(74) *Attorney, Agent, or Firm* — John A. Miller; Miller IP Group, PLC

(57) ABSTRACT

A system and method for setting the slip of a torque converter for a plurality of selected engine speeds and transmission gears. The method includes populating a table off-line, typically using a dynamometer, with torque converter slips for a plurality of selected engine speeds and transmission gears. A speed sensor is used to measure vibrations transmitted through the torque converter to the driveline of the vehicle. The sensor signal is sent to an analyzing system where it is converted to the frequency domain. A separate minimum slip value for each selected engine speed and transmission gear is stored in a table so that during vehicle operation, a controller will instruct the torque converter clutch to set the desired converter slip for the current engine speed and transmission gear provided for a particular throttle position and/or engine torque.

21 Claims, 3 Drawing Sheets

AGGRESSIVE TORQUE CONVERTER CLUTCH SLIP CONTROL DESIGN THROUGH DRIVELINE TORSIONAL VELOCITY MEASUREMENTS

CROSS-REFERENCE TO RELATED APPLICATIONS

This application claims priority to U.S. Provisional Patent Application Ser. No. 61/012,194, filed Dec. 7, 2007, titled "Aggressive Torque Converter Clutch Slip Control Design through Driveline Torsional Velocity Measurements."

BACKGROUND OF THE INVENTION

1. Field of the Invention

This invention relates generally to a system and method for setting the slip in a torque converter of a vehicle and, more particularly, to a system and method for populating a table of minimum torque converter slips for various engine speeds and transmission gears off-line, and then storing the table on the vehicle for later use, so as to minimize vehicle driveline vibrations and provide good fuel economy.

2. Discussion of the Related Art

Internal combustion engine vehicles that employ automatic transmissions typically include a torque converter positioned between the engine and the transmission of the vehicle. A torque converter is a fluid coupling device typically including an impeller coupled to an output shaft of the engine and a turbine coupled to the input shaft of the transmission. The torque converter uses hydraulic fluid to transfer rotational energy from the impeller to the turbine. Thus, the torque converter can disengage the engine crank shaft from the transmission input shaft during vehicle idling conditions to enable the vehicle to stop and/or to shift gears.

The rotational speed of the impeller relative to the turbine in the torque converter is typically different so that there is a converter slip therebetween. Because large slips between the engine output and the transmission input significantly affect the fuel economy of the vehicle, some vehicles employ a torque converter clutch (TCC) for controlling or reducing the slip between the engine and the transmission. The TCC can also mechanically lock the impeller at the output of the engine to the turbine at the input of the transmission so that the engine and transmission rotate at the same speed. Locking the impeller to the turbine is generally only used in limited circumstances because of various implications.

Thus, a TCC generally has three modes. A fully locked mode as just described, a fully released mode and a controlled slip mode. When the TCC is fully released, the slip between the impeller and the turbine of the torque converter is only controlled by the hydraulic fluid therebetween. In the controlled slip mode, the TCC is controlled by the pressure of hydraulic fluid in the torque converter so that the slip between the torque converter impeller and the turbine can be set so that is does not exceed a predetermined slip.

Various engine torque perturbations, engine pulses and other engine noises, generally in the range of 30-300 Hz for an eight-cylinder vehicle, can be passed through the torque converter from the engine to the transmission and onto the vehicle driveline, which are felt by the vehicle occupants as shaking or vibrations and noise of the vehicle. Typically, these engine pulses and perturbations are more easily passed through the torque converter as the amount of slip between the engine and the transmission is reduced. Thus, for those times when the TCC is locked or under low TCC controlled slip, such engine vibrations are typically passed through to the vehicle driveline. These types of engine disturbances and noise vary depending on the engine speed and the transmission gear.

Known techniques for minimizing the transfer of vehicle engine pulses, vibrations and other disturbances to a vehicle driveline have included using different torque converter slips for different engine speeds and transmission gears. In other words, a vehicle operator will test the vehicle at the various engine speeds and transmission gears for different torque converter slips to determine where the vehicle ride is the most comfortable. Thus, there is a tradeoff between occupant comfort and vehicle fuel economy that is determined by the torque converter slip.

SUMMARY OF THE INVENTION

In accordance with the teachings of the present invention, a system and method are disclosed for determining the slip of a torque converter provided between an engine and a transmission of a vehicle, where the converter slip is set by a torque converter clutch. The method includes populating a table off-line, typically using a dynamometer, with torque converter slips for a plurality of selected engine speeds and transmission gears. A speed sensor at an output of the transmission is used to measure vibrations transferred through the torque converter to the driveline of the vehicle. The sensor signal from the speed sensor is sent to an analyzing system where it is converted to the frequency domain. A separate minimum slip value for each selected engine speed and transmission gear is stored in the table so that during vehicle operation, a controller will select the proper value from the table and instruct the TCC to set the desired torque converter slip for the current engine speed and transmission gear provided for a particular throttle position and/or engine torque.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a method for setting a minimum slip for a torque converter between a vehicle engine and transmission for various engine speeds and transmission gears is merely exemplarary in nature, and is in no way intended to limit the invention or its applications or uses.

Figure 1:
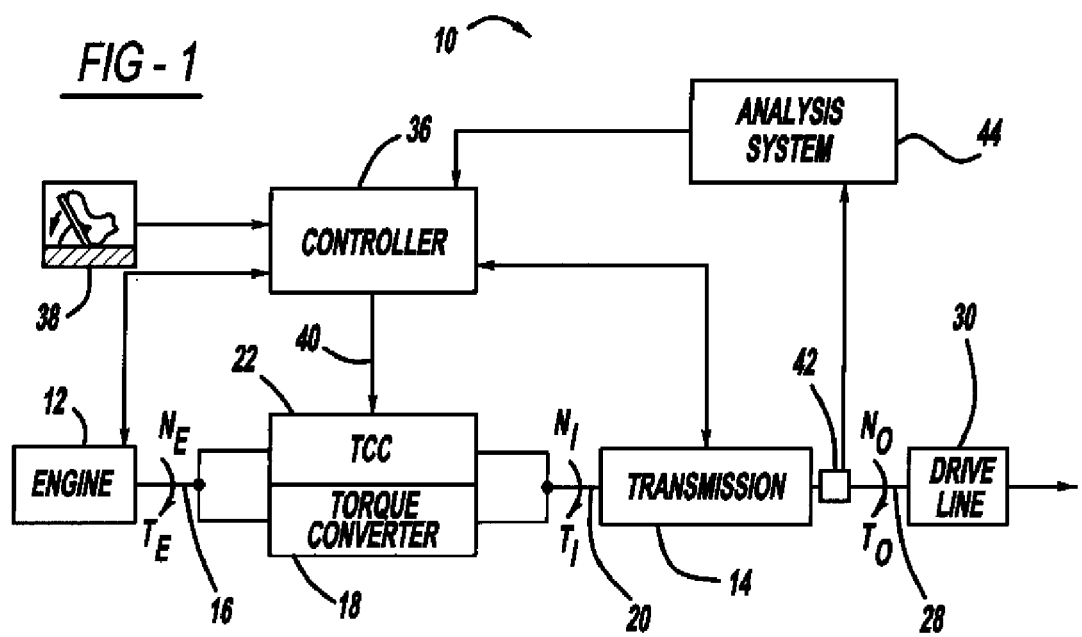
FIG. 1 is a block diagram showing various powertrain components of a vehicle and a torque converter slip analysis system, according to an embodiment of the present invention.

FIG. 1 is a block diagram of various powertrain components of a vehicle 10. The powertrain components include an engine 12 and a transmission 14. An output shaft of the engine 12, represented by line 16, is coupled to one end of a torque converter 18, and an input shaft of the transmission 16, represented by line 20, is coupled to an opposite end of the torque converter 18. As discussed above, the torque converter 18 transfers rotational energy from the engine 12 to the transmission 14 using hydraulic fluid so that the engine 12 can be disengaged from the transmission 14 when necessary. A TCC 22 sets a torque converter slip in the torque converter 18 between the engine 12 and the transmission 14, as discussed above. In this diagram, engine output power is depicted as engine rotational speed $N_E$ measured in revolutions per minutes (RPM) and engine torque $T_E$ measured in Newton-meters. Likewise, the speed of the transmission 14 at its input is represented by transmission input speed $N_I$ and transmission torque $T_I$. The slip in the torque converter 18 is defined as $N_E - N_I$. An output shaft of the transmission 14, represented as line 28, is coupled to a driveline 30 of the vehicle 10 that distributes the engine power to the vehicle wheels (not shown) in a manner that is well understood to those skilled in the art. The speed of the output shaft of the transmission 14 is represented as $N_O$ and the torque of the output shaft of the transmission 14 is represented at $T_O$.

The vehicle 10 also includes a controller 36 intended to represent both an engine controller and a transmission controller. The controller 36 receives a throttle position signal from a vehicle throttle 38, and provides a signal to the engine 12 to provide the necessary engine speed and a signal to the transmission 14 to provide the necessary gear to satisfy the throttle demand. Additionally, depending on the selected engine speed and transmission gear, the controller 36 provides a signal on line 40 to the TCC 22 to set the desired torque converter slip.

The present invention proposes a process for setting the torque converter slip for selected engine speeds and transmission gears so that the slip is at a desired minimum to provide good fuel economy, but is not so low where engine pulses and other noise signals are transferred through the torque converter 18 to the driveline 30 and are felt by vehicle occupants. The process is performed off-line so that a converter slip table, such as shown in table 1 below, can be populated with the desired torque converter slips for later vehicle use. In table 1, the value in each box (a,b,c,d) represents the minimum torque converter slip as set by the torque converter clutch 22 for the particular engine speed and transmission gear. The table is stored in the controller 36 which will select the particular slip and transmit it to the TCC 22 on the line 40 by interpolating between the engine speed values.

10 is connected to a dynamometer. A speed sensor 42 is attached to the output shaft 28 of the transmission 14, and is electrically connected to an analysis system 44. The analysis system 44 is intended to represent the dynamometer and the various control devices necessary to perform the analysis as described herein. As the vehicle engine 12 is ramped up for various transmission gears, the analysis system 44 will select a particular minimum converter slip for the various locations in the table 1, as will be discussed in further detail below. The table is then stored in the controller 36 for use during operation of the vehicle 10.

Figure 2:
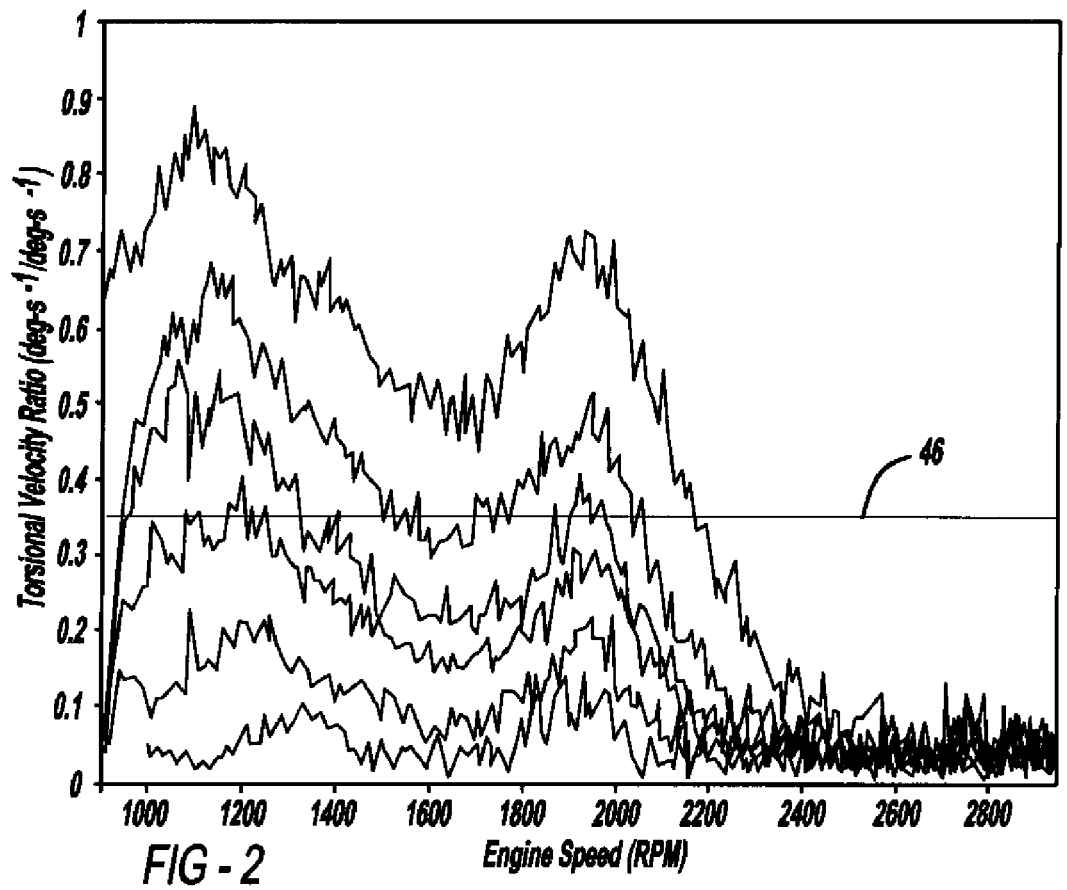
FIG. 2 is a graph with engine speed on the horizontal axis and a torsional velocity ratio on the vertical axis showing the relationship between engine speed and transmission output speed for a particular gear and a plurality of torque converter slips.

FIG. 2 is a graph with engine speed on the horizontal axis and a torsional velocity ratio on the vertical axis that is provided by the sensor output signal from the sensor 42. The sensor signal is converted to the frequency domain by, for example, a fast Fourier transform. FIG. 2 is the graph for one gear of the transmission 14, where other graphs for the other gears would be provided. As will be discussed in detail below, the graph lines are for different torque converter slips, where it is determined if the amplitude of the graph line exceeds a threshold line 46 that represents a condition where engine vibrations and/or engine pulses are transmitted through the transmission 14 to the driveline 30 and felt by vehicle occupants. Although the threshold line 46 is shown as being vertical in this embodiment, the threshold line may have other contours for other conditions, such as engine speed, engine torque, gear, etc.

Figure 3:
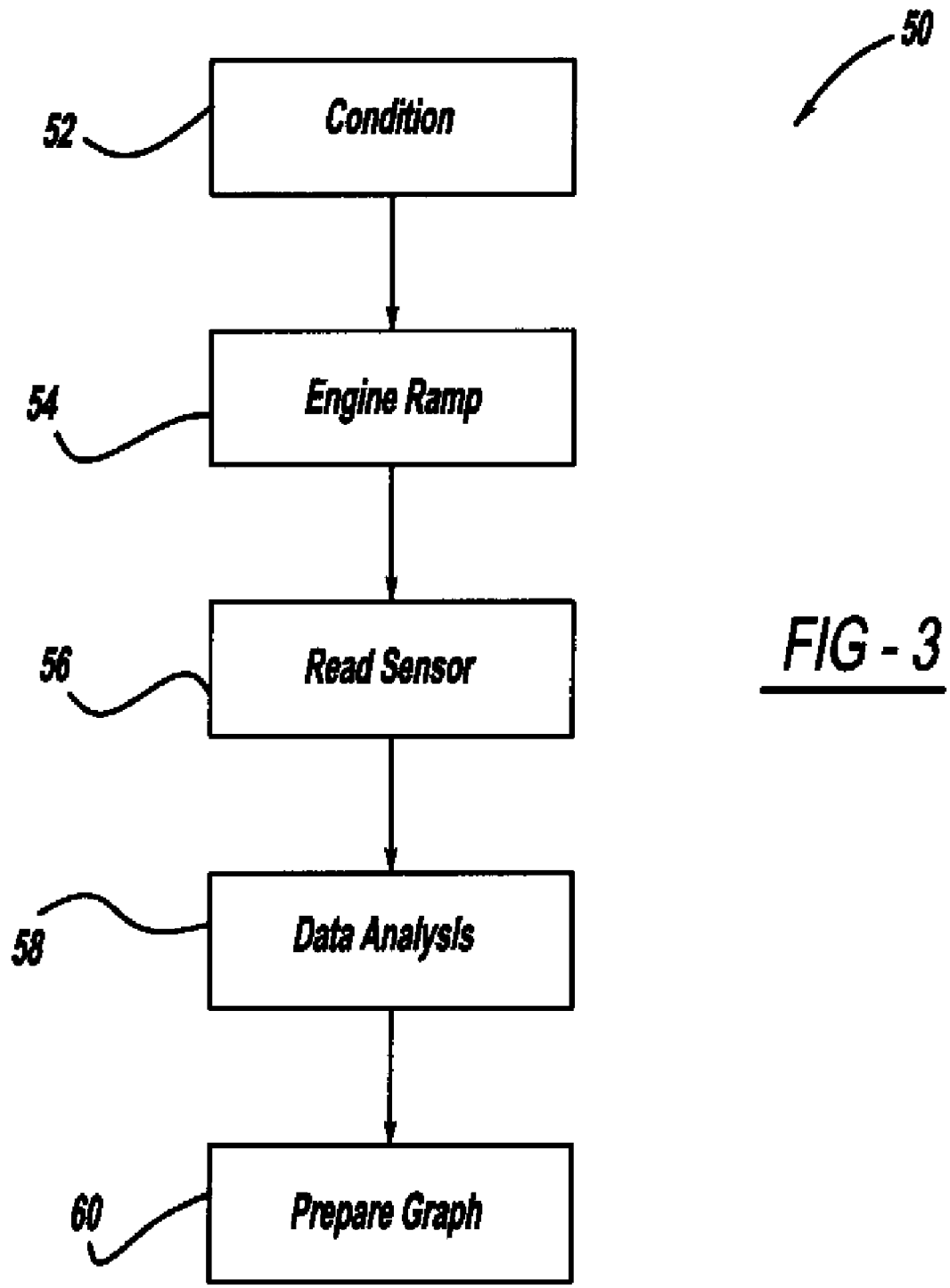
FIG. 3 is a flow chart diagram showing a process for obtaining driveline torsional velocity measurements at different engine speeds and transmission gears, according to an embodiment of the present invention.

FIG. 3 is a flow chart diagram 50 showing a process for generating data, such as represented by the graph in FIG. 2, for a vehicle off-line to populate the table 1. At box 52, the algorithm sets the conditions for the analysis to prepare the graph, particularly setting a gear of the transmission and a torque converter slip. The algorithm will select the particular gear to be analyzed, typically in order, such as from gear 1 to a highest gear 6, and for each gear will select a number of slip conditions in order from low to high, such as a locked TCC, a low slip, a mid slip, a high slip and a completely open TCC. The number of slips used will be application specific. For a particular transmission gear and torque converter slip selected at the box 52, the speed of the engine 12 will be ramped up over a predetermined range, such as from 700 to 3000 RPMs at box 54. As the engine is being ramped up through the range, the analysis system 44 will be reading outputs from the sensor 42 at box 56. The analysis system 44 will convert the speed signal from the sensor 42 to the frequency domain using, for example, a fast Fourier transform process. Once the data is converted, the algorithm then prepares a torque converter slip output, such as the graph lines shown in FIG. 2, for a particular gear at box 60. The amplitude of the graph line through the engine speeds represents a

TABLE 1

| RPM | 500 | 900 | 1100 | 1200 | 1350 | 1600 | 2000 | 2200 | 2400 | 2800 | 7000 |
| --- | --- | --- | --- | --- | --- | --- | --- | --- | --- | --- | --- |
| 2$^{nd}$ Gear | a | b | c | c | c | c | c | c | c | c | c |
| 3$^{rd}$ Gear | a | b | c | c | c | c | c | c | c | c | c |
| 4$^{th}$ Gear | a | b | d | d | c | c | c | c | c | c | c |
| 5$^{th}$ Gear | a | b | d | d | c | c | c | c | c | c | c |
| 6$^{th}$ Gear | a | a | c | c | c | c | c | c | c | c | c |

As mentioned above, the process for setting the torque converter slip for the various engine speeds and transmission gears is performed off-line. In one embodiment, the vehicle measure of how much vibration is being transferred through the torque converter 18 and the transmission 14 to the driveline 30.

Figure 4:
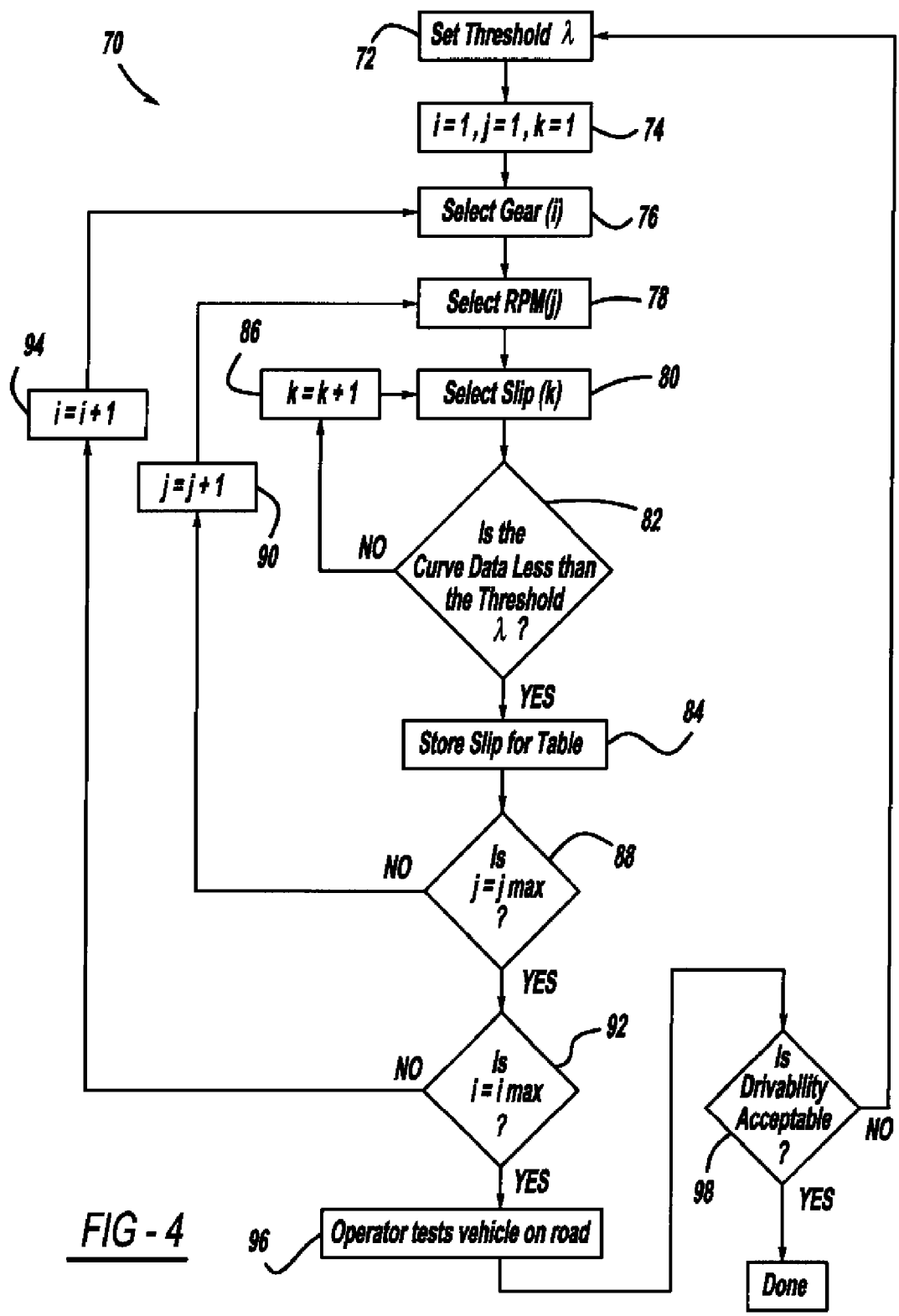
FIG. 4 is a flow chart diagram showing a process for setting the torque converter slip at different engine speeds and transmission gears off-line, according to an embodiment of the present invention.

FIG. 4 is a flow chart diagram 70 showing a process for populating the table 1 using the information generated from the process in FIG. 3. At box 72, the algorithm sets a predetermined threshold λ that identifies a level where the amplitude of the converted sensor signal would start creating vibration problems. At box 74, the algorithm sets three variables, namely a gear i, an engine speed j and a torque converter slip k. In this embodiment, the algorithm sets the gear i, the engine speed j (such as those shown in the table 1) and the converter slip k to a predetermined lowest value. The algorithm then selects the set gear i at box 76, selects the set engine speed j at box 78 and selects the set torque converter slip k at box 80.

The algorithm then determines whether the selected variables cause vibrations that are less than the set threshold λ at decision diamond 82 from the collected data. Particularly, the algorithm will look at a particular graph for the selected gear and a particular graph line in the graph for the selected torque converter slip at the selected engine speed, and determine whether the graph line exceeds the threshold line 46 at that point. If the selected torque converter slip does not cause vibrations that would exceed the threshold λ at the decision diamond 82, then the algorithm will store that torque converter slip value at the proper location in the table at box 84 as the minimum torque converter slip that provides a smooth ride and good fuel economy.

If the selected torque converter slip does cause vibrations that would exceed the threshold λ at the decision diamond 82, then the algorithm increments the torque converter slip to a higher value at box 86, and then selects a new slip at the box 80. Through this process, the algorithm goes from a lowest graph line shown in FIG. 2 to the next highest graph line, until the selected torque converter slip causes the vibrations to be less than the threshold λ for the selected gear and the particular engine speed.

Once the torque converter slip is stored at the box 84, the algorithm determines whether the selected engine speed j is at a maximum value at decision diamond 88, and if not, increments the engine speed j at box 90 and selects a new engine speed j at the box 78. The algorithm then selects the first torque converter slip k at the box 80, and goes through the process of determining the lowest torque converter slip for the new engine speed at the decision diamond 82, as discussed above.

Once the algorithm goes through all of the desired table locations for the engine speed j at the decision diamond 88, the algorithm then determines whether it has gone through all the gears i at decision diamond 92. If the gear i being tested is not the last gear at the decision diamond 92, then the algorithm increments the gear i at box 94 and selects a new gear i at the box 76. The algorithm then goes back through the process of selecting the first engine speed at the box 78 and the first torque converter slip at the box 80 for the new gear i at the same engine speed sample points and the same selected torque converter slips to determine the lowest torque converter slip for the new selected gear. Through this process, the table 1 will become completely populated.

To ensure that the proper threshold has been selected, an actual vehicle test can be performed on the road at box 96, where a vehicle operator will determine if the drivability is acceptable at decision diamond 98, and if not, the process can return to populating the table again using a higher threshold λ at box 72.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for determining a desired torque converter slip for a torque converter that transfers torque between a vehicle engine and a vehicle transmission, said method comprising:
   selecting a gear of the transmission and a torque converter clutch (TCC) slip level;
   increasing an engine speed of the engine within a predetermined speed range;
   providing a sensor signal from a sensor at an output of the transmission that measures transmission output speed;
   transforming the sensor signal to a frequency signal;
   plotting a resultant vibration amplitude for the transmission gear and the TCC slip level using the frequency signal;
   repeating the steps of increasing the engine speed, providing a sensor signal, transforming the sensor signal and plotting the resultant vibration amplitude for all transmission gears and TCC slip levels, wherein transforming the sensor signal to a frequency signal can be done as the measurements of the sensor signal are obtained or after a predetermined number of sensor signals have been obtained and wherein plotting a resultant vibration amplitude is done after the frequency signals have been obtained;
   determining a desired vibration amplitude threshold;
   determining whether an amplitude of the frequency signal exceeds the vibration amplitude threshold for a transmission gear, engine speed and TCC slip level;
   increasing the TCC slip level a predetermined amount if the amplitude threshold is exceeded;
   increasing the TCC slip level until the amplitude threshold is not exceeded;
   storing a minimum torque converter slip in a table corresponding to a selected transmission gear and engine speed; and
   repeating the steps of determining a desired vibration amplitude threshold, determining whether an amplitude of the frequency signal exceeds the vibration amplitude threshold, increasing the TCC slip level, and storing the minimum torque converter slip for all of the transmission gears and engine speeds.

2. The method according to claim 1 wherein selecting the transmission gear includes selecting a plurality of different transmission gears for a plurality of locations in the table so that the torque converter slip for each location in the table can be set.

3. The method to claim 1 wherein the method is performed off-line using a dynamometer.

4. The method according to claim 1 wherein the torque converter slip for the torque converter is controlled by a torque converter clutch.

5. The method according to claim 1 wherein transforming the sensor signal to a frequency signal includes fast Fourier transforming the sensor signal.

6. The method according to claim 1 wherein determining a desired vibration amplitude threshold includes determining the threshold as a function of engine speed, engine torque or gear.

7. A method for determining a desired torque converter slip for a torque converter that transfers torque between a vehicle engine and a vehicle transmission, said method comprising:
   selecting a gear of the transmission;
   setting a predetermined torque converter slip for the torque converter for the selected transmission gear;

increasing an engine speed of the engine within a predetermined speed range;

providing a sensor signal from a sensor that measures transmission speed;

analyzing the sensor signal to determine whether the predetermined torque converter slip would cause significant engine disturbance signals to be transferred to the transmission through the torque converter;

storing a minimum torque converter slip in a table for the selected transmission gear and the engine speed if the predetermined torque converter slip would not cause significant engine disturbance signals to be transferred to the transmission through the torque converter; and increasing the torque converter slip a predetermined amount if the predetermined torque converter slip would cause significant engine disturbance signals to be transferred to the transmission through the torque converter.

8. The method according to claim 7 comprising further generating a series of curves for each torque converter slip and gear over the engine speed range for the sensor signals.

9. The method according to claim 7 wherein analyzing the sensor signal includes transforming the sensor signal to a frequency signal.

10. The method according to claim 9 wherein transforming the sensor signal to a frequency signal includes fast Fourier transforming the sensor signal.

11. The method according to claim 7 further comprising repeating the steps of providing a sensor signal and analyzing the sensor signal to determine whether the predetermined torque converter slip would cause significant engine disturbance signals to be transferred to the transmission through the torque converter for the increased torque converter slip until the increased converter slip does not cause significant engine disturbance signals to be transferred to the transmission through the torque converter, and then storing the increased torque converter slip in the table for the selected transmission gear and engine speed.

12. The method according to claim 7 wherein selecting the transmission gear includes selecting a transmission gear for a plurality of locations in the table so that the torque converter slip for each location in the table can be set.

13. The method according to claim 7 wherein the method is performed off-line using a dynamometer.

14. The method according to claim 7 wherein the torque converter slip for the torque converter is controlled by a torque converter clutch.

15. The method according to claim 7 wherein providing a sensor signal from a sensor includes providing a sensor signal from a sensor that measures an output speed of a transmission.

16. A system for determining a desired torque converter slip for a torque converter that transfers torque between a vehicle engine and a vehicle transmission, said system comprising:

means for selecting a gear of the transmission;

means for setting a predetermined torque converter slip for the torque converter for the selected transmission gear;

means for increasing an engine speed of the engine within a predetermined speed range;

means for providing a sensor signal from a sensor at an output of the transmission that measures transmission speed;

means for transforming the sensor signal to a frequency signal;

means for determining whether an amplitude of the frequency signal exceed a predetermined threshold;

means for storing the torque converter slip in a table for the selected transmission gear and the engine speed if the amplitude of the frequency signal does not exceed the threshold; and means for increasing a minimum converter slip a predetermined amount if the frequency signal does exceed the predetermined threshold.

17. The system according to claim 16 wherein the means for selecting the transmission gear selects a transmission gear for a plurality of locations in the table so that the torque converter slip for each location in the table can be set.

18. The system according to claim 16 wherein the system determines the desired torque converter slip for the torque converter off-line using a dynamometer.

19. The system according to claim 16 further comprising a torque converter clutch for controlling the torque converter slip for the torque converter.

20. The system according to claim 16 wherein the means for transforming the sensor signal to a frequency signal fast Fourier transforms the sensor signal.

21. The system according to claim 16 further comprising means for generating a series of curves for each selected torque converter slip and gear over the engine speed range for the sensor signals.

* * * * *